United States Patent [19]

Lopez

[11] 4,235,718
[45] Nov. 25, 1980

[54] CONTROL DEVICE FOR THE FEEDING AND FOR THE DRAINAGE OF A COLUMN, COLUMN AND DEMINERALIZATION STATION EQUIPPED WITH SUCH A DEVICE

[76] Inventor: Fernand Lopez, 27, rue Emile Barriere, 31200 Toulouse, France

[21] Appl. No.: 921,574

[22] Filed: Jul. 3, 1978

[51] Int. Cl.³ ..................... B01D 23/24; B01D 29/42
[52] U.S. Cl. .................................. 210/191; 210/278; 210/424; 210/425; 137/625.38; 137/625.39
[58] Field of Search ............... 210/134, 136, 190, 191, 210/210, 278, 424–426, 24, 30 A, 30 R, 138, 140; 137/625.37, 625.38, 625.39, 625.4, 625.42, 625.43, 625.5

[56] References Cited

U.S. PATENT DOCUMENTS

| 2,796,177 | 6/1957 | Kryzer | 210/278 X |
| 2,902,155 | 9/1959 | Lundeen | 210/278 X |
| 3,872,004 | 3/1975 | Grout et al. | 210/127 |
| 3,962,089 | 6/1976 | Fulukawa | 210/278 X |
| 4,104,165 | 8/1978 | Braswell | 210/191 |

Primary Examiner—Ferris H. Lander
Attorney, Agent, or Firm—Sandler & Greenblum

[57] ABSTRACT

The invention relates to a control device for the feeding and drainage of a column or a treatment station such as a demineralization station.

The device includes a centralized distribution valve mounted on top of the column; which is equipped with at least three inner chambers having movable pistons adapted to connect various ports which the valve contains. The valve is connected with driving means, e.g., a hydraulic dispenser adapted to generate the shifting of the movable pistons for the purpose of positioning them in several specific positions.

The device of the invention can especially be used in conjunction with demineralization columns containing ion exchanging resins. The device makes it possible to initiate and progress through the various operating phases or modes either automatically or semi-automatically.

13 Claims, 10 Drawing Figures

CONTROL DEVICE FOR THE FEEDING AND FOR THE DRAINAGE OF A COLUMN, COLUMN AND DEMINERALIZATION STATION EQUIPPED WITH SUCH A DEVICE

The invention relates to a control unit for the feeding and the drainage of a column used for the treatment of water (or any other fluid). It relates in particular to demineralization columns containing ion exchange resins, cationic resins and anionic resins as well as demineralization stations combining several complementary columns.

It should be noted that for purposes of simplicity, water has been referred to throughout the application as the fluid to be treated; it should however be well understood that the fluid may just as well be any other fluid whatsoever (alcohol, oils, etc.)

It is known that demineralization stations usually consist of two columns arranged in series one after another, one containing a cationic resin, the other an anionic resin. The water of the distribution network after having passed through the two columns, where the salts in solution are retained, comes out treated and ready for use. During the processing periods the ion exchange resins are gradually exhausted and must be regenerated by means of a regeneration cycle normally comprising a counter-current flow flushing with water. The regeneration step is performed by flow of a regeneration agent (dilute hydrochloric acid for the cationic resins and a soda solution for the anionic resins) and then a rinse performed with flowing water. During this regeneration operation the water or sewage leaving the columns are drained to a sewer.

Until now existing demineralization stations have been equipped with a set of complex pipe lines to handle the various operations of circulation in the columns dealing either with the service operation or with different phases of the regeneration operations. These pipes are inserted into the columns and are connected via multiple manual valves. The machine operator generally manipulates several valves towards the closed position and several valves towards the open position in order to perform the desired operation. For example, the most generally used demineralization stations having two treatment columns include 13 valves and in order to go from the service operation to the first phase of the regeneration operation alone (clearing phase) the machine operator has to perform 5 manipulations and a total of 26 manipulations for a complete regeneration.

It is easy to understand that, under such conditions, the control of demineralization stations is not only complicated but is also subject to numerous inaccuracies; these risks being increased where the frequency of regeneration is relatively high (about once a week). In other respects, the insertions of the different pipes into the columns, usually made of synthetic material reinforced with glass fiber (polyester or other) considerably reduces the mechanical resistance of the columns and cause significant risks of splitting.

The purpose of this invention is to overcome the faults of the columns or conventional demineralization stations and to provide a device for the control of the feeding and drainage of each column; a device able to suitably assure the intake and exhaust of the water or of a regeneration agent in service operation (treatment of the water which is distributed for use) as well as in the regeneration operation (regeneration of the resins or in a more general way of the material for the treatment held in the column).

One aim of this invention is, in particular, to extensively simplify the manipulations to be made while eliminating any risk of error.

Another purpose of the invention is to do away with all the insertions into the column and to leave only one intake and one exit, located on the top of the column at the level of the upper opening with which the column is provided at the time of its manufacture. It should be noted that the words "intake" and "exit" that have been used do not only imply the direction of the water flow during the service operation, but are also taken in a broader meaning, independently of the direction of the flow, for some of the recycle phases (in particular for the clearing phase, where, as it will be seen, the water runs in counter-flow in comparison with the normal flow and goes into the column through the "exit" and comes out through the "intake").

The device according to the invention has as an aim to ensure the control of the feeding and the drainage of one column for water treatment and essentially comprises a centralized distribution valve, its means of control being one hydro-injector fed with water to suck in a regeneration agent. According to this invention, the distribution valve is made of at least three inner chambers:

- a first chamber, called the water distribution chamber, comprising an intake port Ee for feeding water to be treated into the chamber and an exit Sh for feeding water into the hydro-injector;
- a second chamber, called the direction reversal chamber, into which emerge on the one hand a port Er for entry of the regeneration agent in communication with the hydro-injector, and on the other hand, the ports C1 and C2 communicating respectively with the intake and the exit of the column to ensure the flow of either the water or the regeneration agent between the valve and the column in one direction or in the other; and
- a third chamber, called the exit chamber, having a port Se for treated water and a port Sr for drainage towards the sewer.

The distribution chamber is adapted to be connected to the direction reversal chamber and holds a piston adapted to be shifted between two positions, one PE1 in which the flow of the water is made from port Ee of the intake towards the reversal chamber, the other position PE2, in which the flow is directed towards the exit Sh.

The direction reversal chamber is adapted to be connected to the exit chamber and comprises a reversal piston adapted to be shifted between two reversal positions, one position, PI1, in which the flow is taking place, and on the other hand from the water distribution chamber or from port Er for intake of the regenerating agent towards port C1 connected with the intake of the column; on the other hand from port C2 connecting with its exit towards the exit chamber, and the other PI2 in which the flow is taking place on the one hand from the water distribution chamber or from port Er of the intake of the regenerating agent towards port C2 on the other hand from port C1 towards the exit chamber.

The exit chamber has an exit piston adapted to be shifted between two positions, one PS1 in which the flow occurs from the direction reversal chamber towards port Se for drainage of the treated water, the other position PS2 in which the flow is from the direction reversal chamber towards port Sr for drainage towards the sewer.

Thus, the pistons can be put into positions, which while united with each other, still give several configurations each one ensuring in the valve, as well as in the treatment column, a circulation suitable to a given phase of operation.

In particular, the control means of the distribution valve are adapted to shift the three above-mentioned pistons so they can be set respectively into the following configurations:

PE1, PI1, PS1 corresponding to the configuration called the service configuration, PE1, PI2, PS2 corresponding to the configuration called the clearing or flushing configuration, PE2, PI1 or PI2, PS2 corresponding to one or more regeneration configurations; and, PE1, PI1, PS2 corresponding to a configuration called the rinse configuration.

The so-called service configuration corresponds to normal operation or the service mode where the water of the network to be treated goes in through the intake port Ee, then flows out through port C1 towards the intake of the column, passes through it to undergo its treatment, is directed through port C2 and comes out of the valve through the exit port Se which is connected with the use pipe.

The so-called clearing or flushing configuration corresponds to a phase of the regeneration operation (preliminary phase) during which water of the distribution network is led into the column through port C2, passes through it counter-flowing (the direction of circulation being opposite to the normal direction in the service operation) and is drained into the sewer by the drainage port Sr.

The regeneration configuration or configurations correspond to the regeneration phases, during which the regeneration agent is taken into the column, passes through it and is drained into the sewer.

In most applications, the control device may be adapted so that its movable pistons produce a regeneration configuration called co-flow regeneration (PE2, PI1, PS2) in which port Er is connected with port C1 while port C2 is connected with port Sr. This configuration corresponds to a flow of the regeneration agent in co-flow (normal direction of circulation of the water in the column in service operation) and eventually, as it will be seen, to a slow co-flow rinse when the quantity of the provided regenerating agent is exhausted.

For other applications, a different regeneration configuration called counter-flow regeneration, may be provided (PE2, PI2, PS2) in which port Er is connected with port C2, and port C1 is connected with port Sr. This configuration corresponds to a pass through of the regeneration agent in counter-flow (direction of the flow being opposite to the normal direction in the service operation) and, eventually to a slow rinse in counter-flow. This regeneration is desirable in some cases, particularly because it saves some regenerating agent.

In other respects, in a most preferred embodiment, the centralized distribution valve is a compact unit fitted with a neck having fastening means such that it can be mounted on the top of the treatment column. This neck is provided with the ports C1 and C2 previously discussed, which are equipped with watertight ports coupled respectively with the intake and with the exit of the columns. In this embodiment, the column exit ends at the top of the column by way of an ascending duct provided inside and along the entire height of the column.

The distribution valve may be especially made up of three bodies, each one having a chamber and its piston, i.e., a central body mounted substantially vertically on top of the column and comprising the above mentioned neck and its openings which are used to couple the valve on the column and two lateral bodies, set out horizontally in two radial directions in relation to the central body and connected to it.

The hydro-injector connected to the valve may have a venturi and can be attached to the central body of the valve in a radial direction in relation to the latter, to form a compact unit with the valve.

In other respects, the control means which allow for the positioning of the pistons in a particular configuration can be accomplished by different means: mechanical means, adapted in such a manner that the pistons can be moved properly, hydraulic means, electric means, pneumatic means, etc.

According to a more preferred embodiment, the control means are hydraulic and contain a hydraulic dispenser with several exits adapted to distribute the water pressure in the valve chambers in order to shift the movable pistons inside them and put them in the desired position. This dispenser can in particular have several plugging dispenser pistons arranged radially in relation to a central cam-shaft. Depending on the angular position of the cam-shaft, each piston blocks an exit of the dispenser or, on the contrary, releases it and connects it with the water pressure intake, in such a manner that the corresponding chamber of the distribution valve is or is not put under hydraulic pressure.

The above cam-shaft can be interdependent with a manual knob. An operator manually turns the knob from one position to the next in order to go from one phase to the other. Thus each phase is so conditioned that it is impossible to make any distribution error by a single handling.

The diverse angular and successive positions of the cam-shaft are, preferably, related to the phases which should be carried out in succession and the work of the operator amounts only, at the beginning of each phase, to a fractional rotary turn of the cam-shaft, without running any risk of incorrectly setting the phases.

The cam-shaft can also be connected with driving means for rotary motion (electric motor or other) subject to a programming device thus allowing the shaft to turn automatically from one position to the next, at the end of each phase. Thus, it becomes a completely automatic device, able to control the development of a regeneration cycle to end up at the service operation without any human intervention. The programming device can have time-delay means, fixing a duration period for each phase, and then starting the following phase at the end of this duration. The program can also be connected with a clock to start the regeneration cycle at the end of a given period of use. In this way the controls become quite automatic and do not require any outside intervention.

The programming device can be connected to detectors embedded in the distribution valve which are able to detect the end of a phase by means of measuring an operating parameter, in order to initiate the following phase. For instance, the regeneration cycles can be started by measuring the resistivity of the treated water and by producing an electric impulse control signal when this resistivity goes below a specific threshold.

It should be noted in other respects that the hydraulic dispenser connected with the distribution valve can also be joined in a compact unit with that valve or on the contrary be apart therefrom and mounted on a console located near the treatment column or at a given distance from it depending on the application.

The present invention which is directed at a control device for the feeding and the drainage of a column extends also, of course, to any water treatment column equipped with such device and for any treatment station combining several columns each equipped with such a device. It particularly aims at a demineralization column containing ion exchanging resins, as well as a demineralization station made of at least two columns, one having a cationic resin, the other an anionic resin; each column being equipped with a control device corresponding to the invention: port Ee for the inflow of water from a device is connected with the distribution network of water to be treated, while port Se for the outlow of water of that device is connected with port E'e for the inflow of water of the other device and that port S'e for the outflow of water of that latter device is connected with a consumption line.

Having described the invention in a general fashion, other characteristics, purposes and advantages shall become clear from the description which follows with reference to the annexed drawings, which are given as non-restrictive examples;

Figure 1:
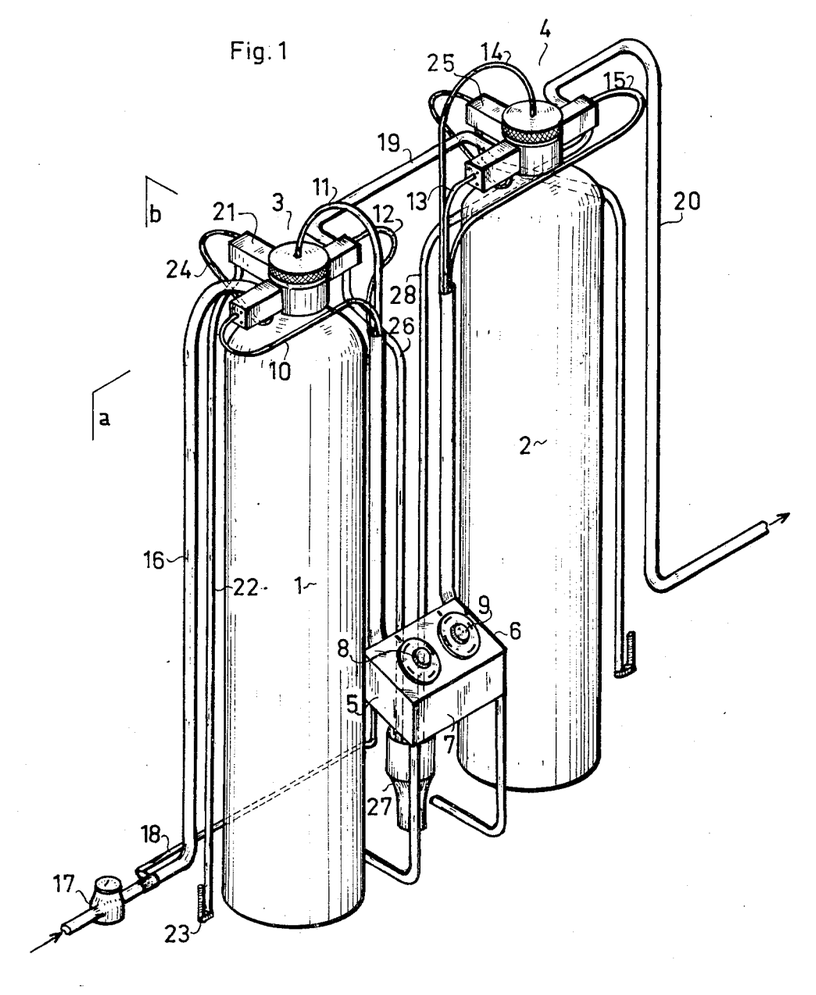
FIG. 1 shows, in schematic perspective, a demineralization unit according to the invention.

The demineralization station shown by way of example in FIG. 1 includes essentially:

a treatment column 1 containing a cationic exchange resin;

a treatment column 2 containing an ionic exchange resin;

a distribution valve 3 screwed on the top portion of the column in order to feed it with water or with a regeneration agent, in this case some dilute hydrochloric acid, and also to divert the water or regeneration agent at its exit after having passed through the column;

a distribution valve 4 of similar structure as valve 3 screwed onto the top portion of column 2 for the same purpose (the regeneration agent in this case comprising a soda solution.)

two hydraulic dispensers 5 and 6 arranged on a console 7 close to the columns, each dispenser being in this instance equipped with a manual handle or knob which can be seen at 8 or 9 of FIG. 1 serving to respectively control each valve (valve 3 for dispenser 5 and valve 4 for dispenser 6);

three ducts 10, 11, and 12; or 13, 14 and 15 connecting each dispenser 5 or 6 to its valve 3 or 4 (in the illustration shown at FIG. 1, the ducts are sheathed along a portion of their run);

one duct 16 for the intake of the water to be treated towards valve 3, connected with the water distribution network, especially by the interposition of a pressure relief valve 17;

a hydraulic pressure inlet 18 for feeding the two dispensers 5 and 6 thus providing for the control of the valves;

a duct 19 connecting valves 3 and 4, in such a way that, after having passed through column 1, the water flows through column 2 being in operation, is thus arranged serially behind the first column;

a duct 20 for the exit of the treated water towards the utilization stations (consumption network) after having passed through the two columns;

a hydro-injector 21 attached to valve 3 to feed it with regeneration agent. This hydro-injector sucks in the regeneration agent by way of duct 22 ending at strainer 23 equipped with a closing valve shutting itself off in the case of a lack of the regenerating agent, this strainer is to be immersed in a tank of regeneration agent (not shown); moreover, hydro-injector 21 is fed by duct 24 joined to valve 3 with driving or aspirating water, in order to hydraulically produce a suction;

a hydro-injector 25 similar to injector 21 and joined to valve 4 to feed it with regeneration agent; and a drainage duct 26 connected to valve 3 extending to main sewer 27, and a similar drainage duct 28 connected to valve 4 and ending in the main sewer.

FIG. 1 shows a possible arrangement of the different means described above; the columns have no tapping and are simply coupled at their upper sections to the corresponding valves 3 or 4.

Figure 2:
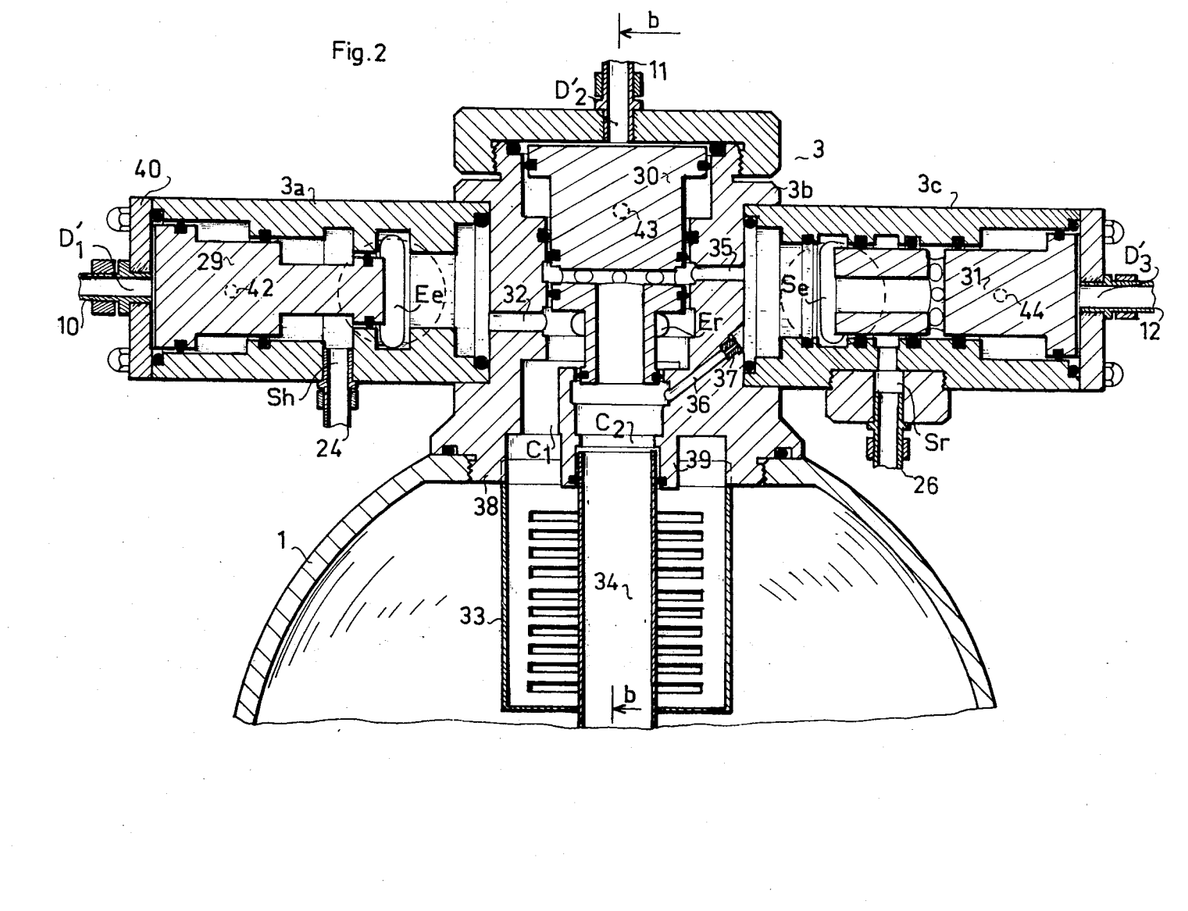
FIG. 2 is a partial section, along vertical plane aa, of a distribution valve equipping each column of the unit.
Figure 3:
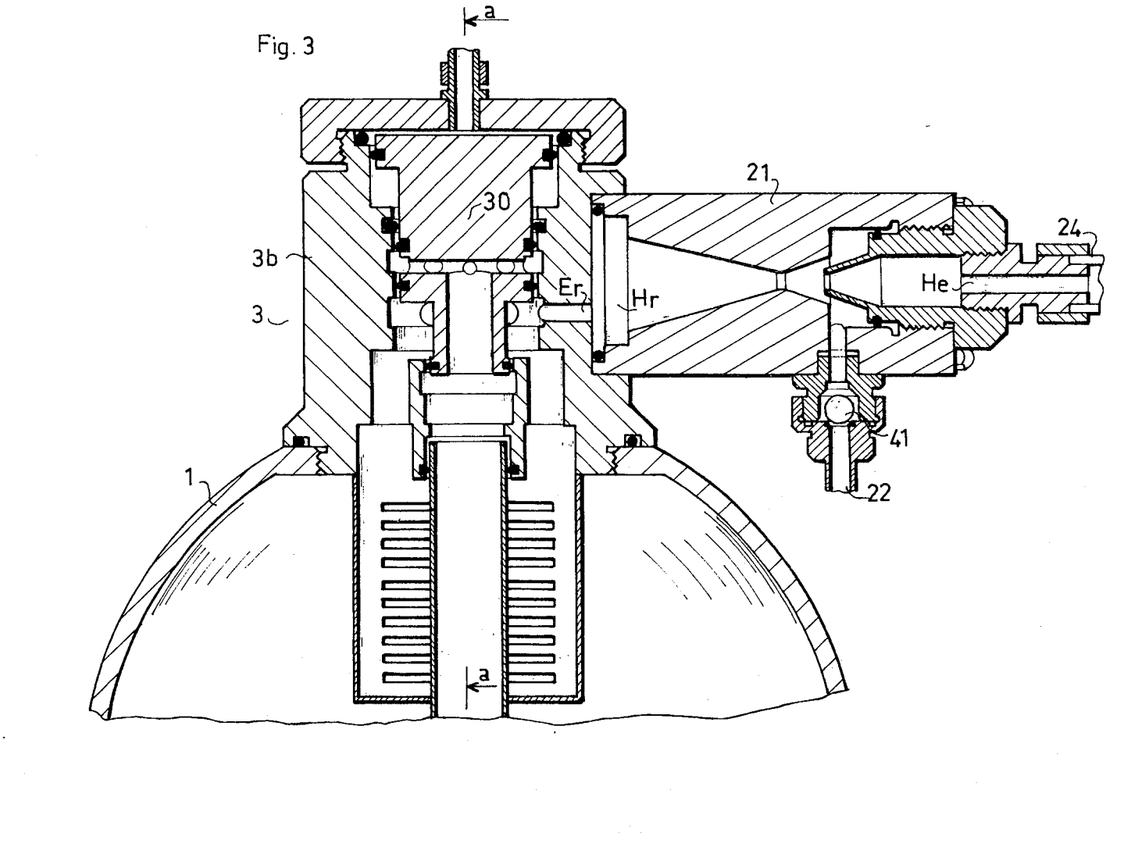
FIG. 3 is a partial section of the valve, along a vertical plane bb orthogonal to plane aa.

FIGS. 2 and 3 show, in detailed cross-section a distribution valve and its hydro-injector, for instance valve 3 and its hydro-injector 21.

The distribution valve is made up of three inner chambers: the water distribution chamber, having a piston 29 able to be moved into two positions (hereinafter indicated by PE1 and PE2 respectively), a second chamber called the direction reversal chamber, having a piston 30 adapted to move between two positions (indicated by PI1 and PI2), and finally a third chamber, called the exit chamber, having a piston 31 movable between two positions (indicated by PS1 and PS2).

Duct 16 for the intake of the water leads into the water distribution chamber through port Ee of the water intake while duct 24 for feeding water into hydro-injector 21 escapes from that chamber through exit Sh and leads into the hydro-injector through a driving water intake He. Moreover, the water distribution chamber is adjusted to be connected by port 32 with the direction reversal chamber.

The direction reversal chamber is equipped with chamber inlet port Er for the intake of the regeneration agent which is connected with exit Hr of the hydro-injector through which the diluted regeneration agent escapes. In addition, this direction reversal chamber is connected via first chamber passage C1 with the intake of column 1, and second chamber passage C2 with its exit. The column's intake is, in this example, ring-shaped and is equipped with one strainer 33 which holds back the resin grains. The exit of the column passes through the upper opening of ascending duct 34 arranged along the column axis.

The direction reversal chamber mentioned above is further adapted so that it is in communication with the exit chamber, in this example, via port 35 and by a bore 36 equipped with a socket 37 with a sized opening, whose functions will be described below.

Finally, duct 19 for the outflow of the water from valve 1 leaves the exit chamber via first exit outlet Se for draining water, while the drainage duct 26 leaves the chamber through a second exit outlet or drainage port Sr.

As shown on FIGS. 2 and 3, each chamber contains a hydraulic inlet control D'1, D'2 or D'3 at the end of which is one of ducts 10, 11 or 12 which joins it to the hydraulic dispenser 5. These intakes D'1, D'2 or D'3 are located at the end of the corresponding chamber to exert water pressure on one side of the pistons 29, 30 or 31 inside the chambers. Each one of these pistons is adjusted in such a way that the pressure of either the water to be treated or the regeneration agent which passes through the valve, exerts pressure on the opposite side of the pistons having a greater surface. Thus, the return of the piston is assured by the water or the regeneration agent whenever the driving pressure has stopped at the controls' intake (thereby excluding any spring or any other mechanical means).

In this example, valve 3 comprises three main bodies 3a, 3b, and 3c each having one chamber and a piston and provided with ports as previously described. Main body 3b is arranged vertically in a central position and contains a threaded neck 38 and a gasket which makes it possible to fasten the valve on column 1 by screwing the valve into the upper opening of the column which is threaded for that purpose. This neck is provided along its axis with an outlet 39 with a gasket which defines port C2 and cooperates with the upper end of conduit 34.

Bodies 3a and 3c are radially arranged with respect to central body 3b and are joined to this body at opposite sides of 3b, preferably by means of bolts and of tightening nuts which hold them against it. Watertightness is assured by compression of torus shaped joints.

Each body 3a, 3b or 3c is closed at the end of its chamber by a cover such as 40 traversed hydraulic control intakes D'1, D'2 or D'3.

The hydro-injector 21 is arranged at the back of the valve on central body 3b and extends in a radial direction thereto as shown in FIG. 3. The exit Hr of the hydro-injector is arranged to face chamber inlet port Er for feeding regeneration agent, held by central body 3b. The hydro-injector comprises a venturi fed with driving water through its intake He (in communication as previously indicated with the exit Sh of the water distribution chamber of the valve) and equipped with a tapered section. A duct 22 opens adjacent to the narrowed section such that concentrated regenerating agent is drawn into the flow. A non-return ball valve 41 removes any risk of back-flow towards duct 22. Thus, during the regeneration phase, diluted regeneration agent is drained through exit Hr until all of the regeneration agent has been exhausted. A slow water rinse then occurs as the water passes through the hydro-injector.

In other respects, as shown in FIG. 2, pistons 29, 30 and 31 are surrounded by several torus shaped gaskets arranged (with respect to internal ports as to pistons 30 and 31) in such a way that their respective positions PE1 or PE2, PI1 or PI2, PS1 or PS2, result in the following configurations:

First position PE1 of piston 29 of the water distribution chamber (position shown in FIG. 2)—the water passes through the chamber from distribution inlet port Ee towards the direction reversal chamber via port 32, the water distribution outlet Sh of the hydro-injector being blocked.

Second position PE2 of piston 29, obtained by pressurizing the distribution chamber through hydraulic control inlet D'1 (a vent hole 42 assures the discharge of air); water then passes towards the distribution outlet Sh, the direction reversal chamber no longer being fed through port 32.

First reversal position PI1 of piston 30 in the direction reversal chamber (position shown in FIG. 2) the run through is made, on the one hand, from the water distribution chamber (via port 32) or from chamber inlet Er (entry of the regeneration agent towards first chamber passage C1 connected with the intake of the column), on the other hand, from port C2 connected at its exit towards the exit chamber via port 35 and bore 36. Since port 35 is not small gauged, a high rate of flow is prevalent.

Second reversal position PI2 of piston 30, obtained by putting the direction reversal chamber under pressure via hydraulic control inlet D'2 (vent hole 43 assures the air discharge). The flow occurs in the opposite direction in other words, on the one hand, from the water distribution chamber or from chamber inlet Er of the intake of the regeneration agent through the inner ports of piston 30 towards second chamber passage C2, on the other hand, from first chamber passage C1 towards the exit chamber through gauged bore 36; this last run occuring at low flow.

First position PS1 of piston 31 of the exit chamber (position drawn at FIG. 2). This pass is made from the direction reversal chamber towards first exit outlet Se for exit of the treated water. The second exit outlet Sr for drainage to the sewer is blocked.

Second position PS2 of piston 31, obtained by putting the chamber under pressure through hydraulic control intake D'3 (vent hole 44 assures air removal). The pass then occurs from the direction reversal chamber towards second outlet exit Sr for the drainage towards the sewer. The first exit outlet Se is blocked off.

It is thus apparent that the system may be simply operated by properly pressurizing the chambers through intakes D'1, D'2 and D'3 to shift the pistons as a function of the desired operations or cycles in order to arrange them in one of the eight possible configurations; configuration PE1, PI1, PS1 corresponding to the service configuration during normal use.

Drive of the pistons is assured by hydraulic dispenser 5, which, in this example, is mounted on console 7 in order to be within reach of an operator. The dispenser could also be connected to the corresponding valve to make up a compact unit especially in the case already mentioned where it is actuated by an automatic programmer.

Figure 4:
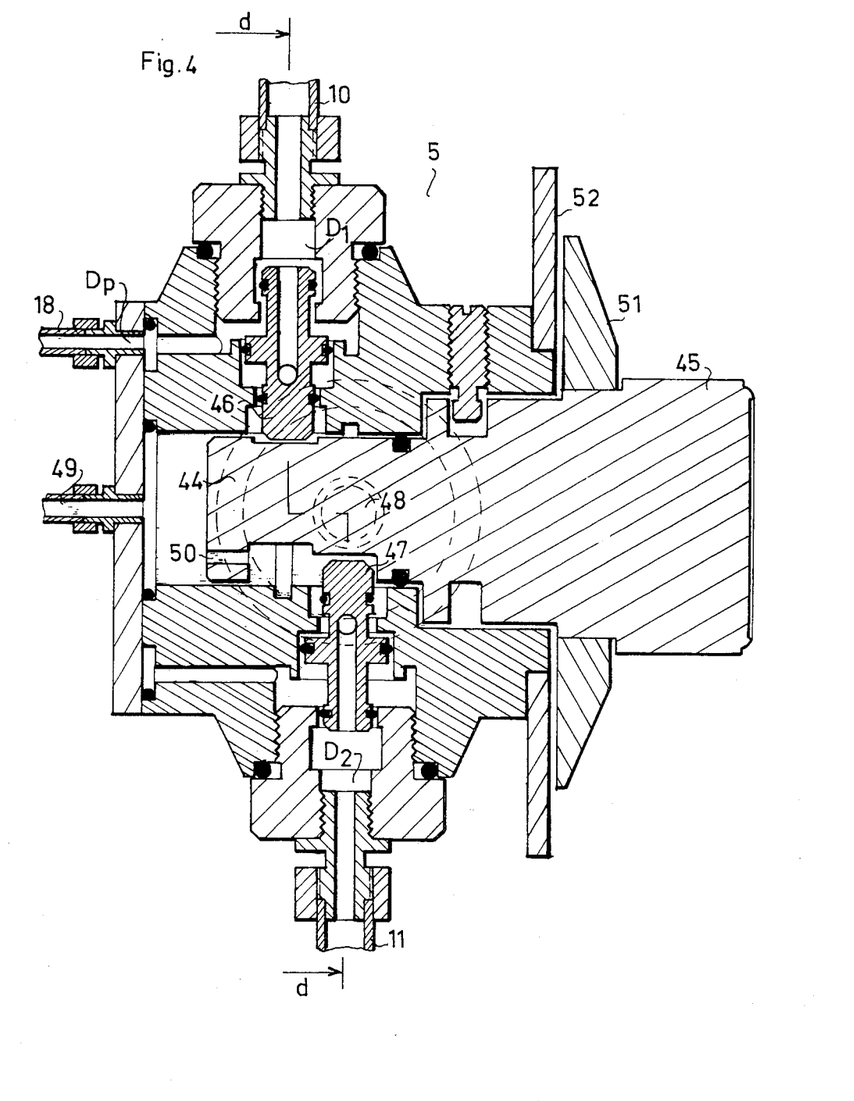
FIG. 4 is a section along an axial plane cc of a hydraulic dispenser connected with each distribution valve.
Figure 5:
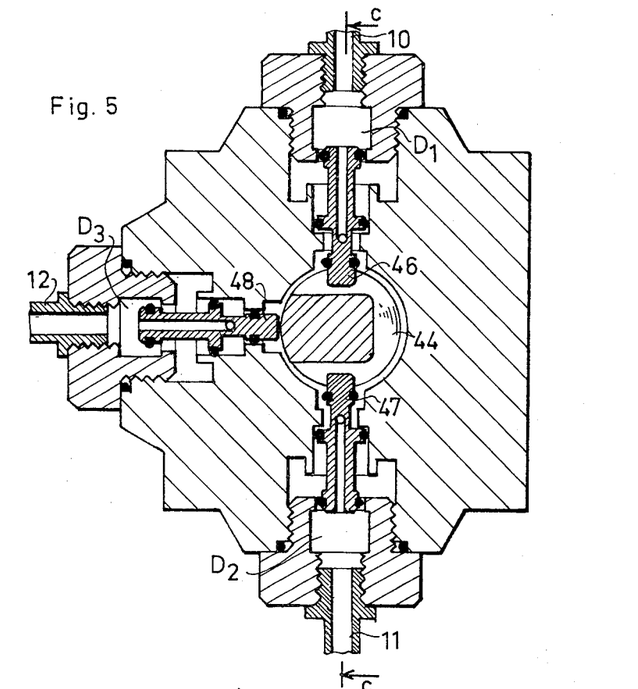
FIG. 5 is a transverse section along line dd of FIG. 4.

FIGS. 4 and 5 show respectively along cross-section cc and along cross-section dd, one embodiment of the hydraulic dispenser 5.

The dispenser comprises a body axially drilled to accommodate rotatable cam-shaft 44, which ends in a handle or knob 45. The dispenser comprises three radial chambers, each having a dispenser piston 46, 47 and 48 arranged radially with respect to cam-shaft 44. Each dispenser piston touches the cam-shaft in such a manner that, depending on its angular position, it either shuts off exit D1, D2 or D3, or on the contrary, releases it and connects it with an intake of water pressure Dp connected to the hydraulic pressure inlet 18 which feeds the dispenser.

The three exits D1, D2 and D3 are respectively connected with the hydraulic control intakes of the valves D'1, D'2 and D'3. In this embodiment drain 49 is provided to allow the drainage of the residual water towards the sewer when the valve chamber is no longer under pressure, in other words, whenever the corresponding dispenser piston is put into the position where it blocks the water from flowing in towards that chamber.

In the embodiment shown in FIGS. 4 and 5, the dispenser pistons are adapted to touch against the cams of shaft 44 by the water pressure let in by intake Dp thus obviating the need for any spring or other mechanical part. Moreover, the above mentioned drainage is made by means of an inner bore drilled within each piston, which, whenever the piston is not pushed back by a cam (position of piston 47 in FIG. 4) opens into the axial housing of the cam-shaft and is in communication with drainage exit 49 via the bore 50 in that shaft.

Reference is made to FIGS. 4 and 5 for supplementary details as to the assembly of the pistons and their watertight joints.

In these Figures knob 45 bears a crown 51 which turns while facing plate 52. This crown and this plate make it possible to mark off the different angular positions of the cam-shaft which correspond to the various phases of operation (normal service operation or phases of regeneration operation).

In the case of a three phase regeneration operation (clearing, co-flow regeneration and rinse), cam-shaft 44 is adjusted to have four successive angular positions which define four different configurations of the three dispenser pistons 46, 47 and 48. For this reason the shaft has four areas on its periphery, each extending at 90 degrees and equipped with appropriate cams to either push back or release the pistons.

Figure 6A:
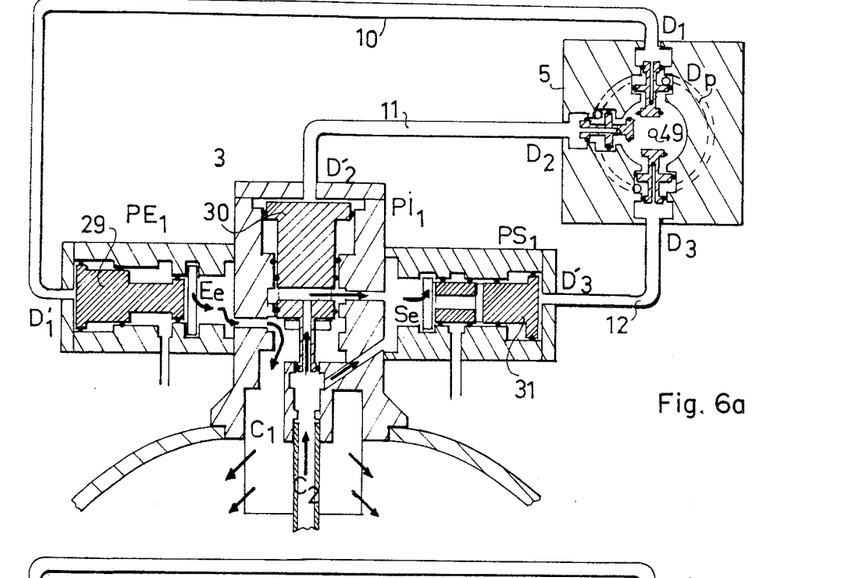
FIGS. 6a, 6b, 6c, and 6d are flow diagrams showing how the device operates.

FIG. 6a shows valve 3 and its dispenser 5 at one of the angular positions of the cam-shaft corresponding to the service operation. The three dispenser pistons of the dispenser are not pushed back by the cam-shaft (lack of lug at the level of the three pistons for that angular area) and they assume a centripetal position under the pressure of the feeding water. In this position they block off passage of the water under pressure towards exits D1, D2 and D3 which are connected with drainage exit 49. Pistons 29, 30 and 31 of the valve are arranged to provide the service operation configuration PE1, PI1, PS1. The directions of water flow are shown by the arrows.

Figure 6B:
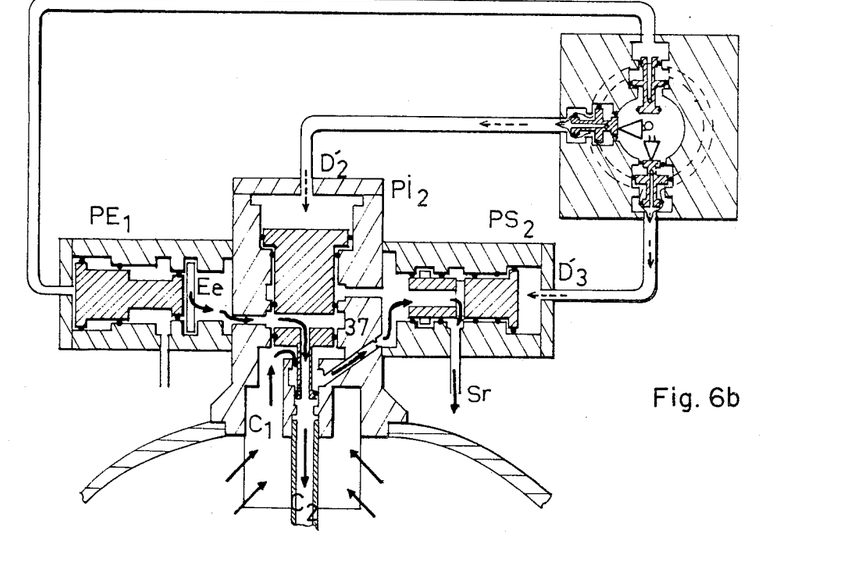

Upon subjecting cam-shaft 44 to a rotation of a quarter turn, the dispenser and the valve are put in the position shown in FIG. 6b which corresponds to the clearing or flushing phase. The cams of the shaft have pushed back two dispenser pistons (action symbolized by arrows) in such a way that the direction reversal chamber as well as the exit chamber are pressurized by virtue of their inlets D'2 and D'3. The pistons are arranged such that during the clearing or counterflow configuration PE1, PI2, PS2: the water flows countercurrently through the column causing a clearing or de-squeezing or flushing of the resin and is then discarded in the sewer. As is preferred during this phase of operation, the clearing flow is slow since the pass through between the direction reversal chamber and the exit chamber is made via gauged opening 37. This flow can be regulated, depending on the application by adjusting the cross-section of this aperture.

Figure 6C:
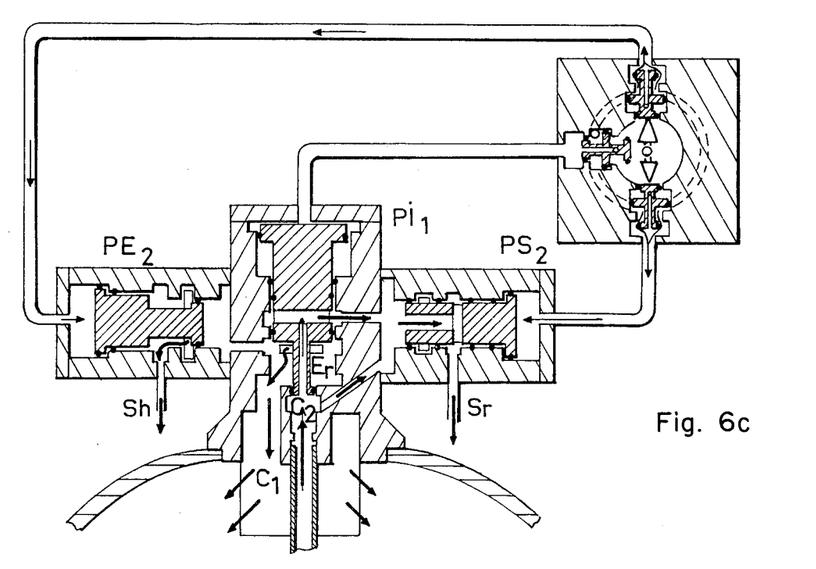

Advancing the shaft 44 by a quarter of a turn puts the dispenser and the valve in the position shown at FIG. 6c, which corresponds to a co-flow regeneration phase. In this configuration, the valve pistons are arranged in configuration PE2, PI1, PS2; the hydro-injector is fed with water via exit Sh of the water distribution chamber and the diluted regeneration agent enters the direction reversal chamber via port Er. The regenerating agent flows through the column in the normal direction and is discarded in the sewer. When the quantity of regeneration agent is exhausted, the driving water which feeds the hydro-injector continues to pass through the column resulting in a pre-rinse at low flow.

Figure 6D:
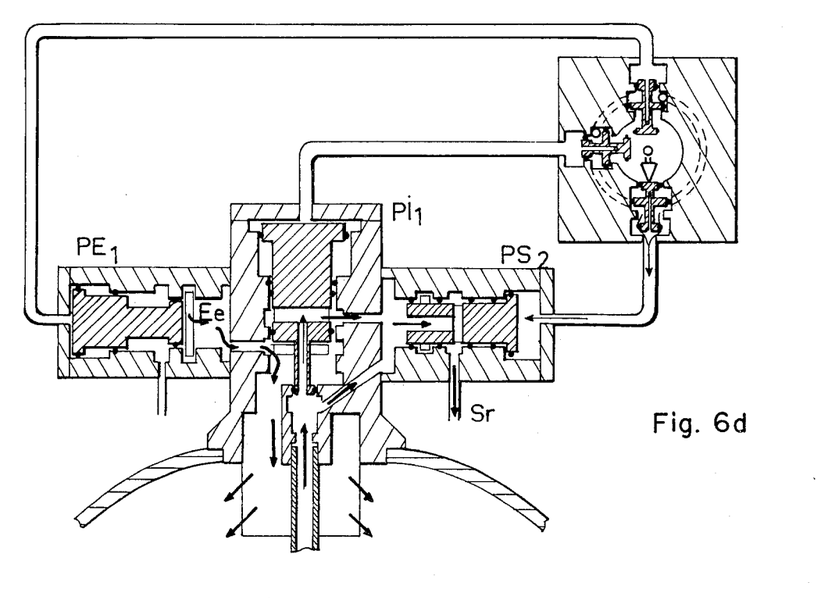

Yet another quarter turn arranges the dispenser and the valve in the position shown in FIG. 6d, which corresponds to the rinse phase (quick rinse). During this phase, the pistons of the valve are set in configuration PE1, PI1, PS2 so that the water flowing in through the distribution inlet port Ee flows through the column in cocurrent flow and is discarded to the sewer.

Another quarter turn returns the valve and the dispenser to service operation.

Once can easily see the advantages of such a device which makes all manual operation as simple as possible, excludes any possibility of error, and does away with any tapping on the column.

It should be noted that the valve and the dispenser are preferably made out of synthetics, especially P.V.C. in order that no metallic part ever contacts the fluids (demineralized water as well as regeneration agent being very corrosive towards ferrous metals).

Figure 7:
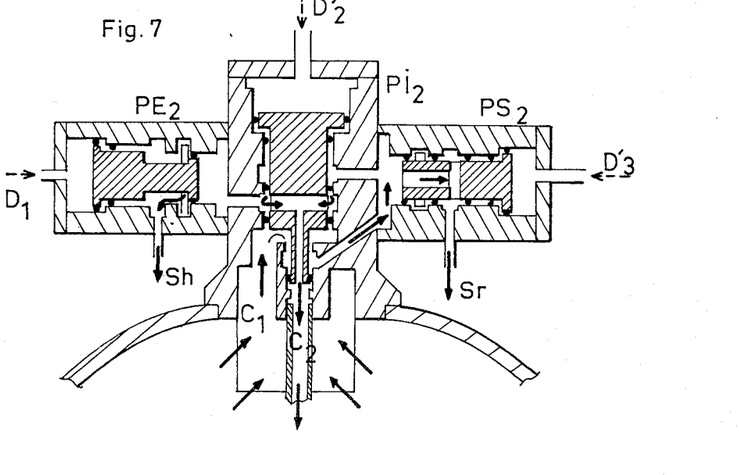
FIG. 7 is an additional diagram showing an alternative embodiment of the device made for a slightly modified regeneration cycle.

By simple adjustment of the dispenser, it is possible to modify the regeneration cycle. According to an alternative embodiment of the preceeding device, the dispenser is adapted to cause the following four configurations of the three dispenser pistons: the configuration shown in FIGS. 6a, 6b and 6d, and one configuration in which the inlets of the three controls of the valve are fed; the valve's pistons are in this last case driven to be arranged in the configuration shown in FIG. 7: PE2, PI2, PS2, in this configuration called counter-flow regeneration. The regeneration agent flows in the column in counter-current flow and at a low rate before being drained to the sewer. It is thus possible, in some cases, to achieve a more effective regeneration of the resin.

In a demineralization station with two or more columns, the resin is regenerated successively, going from the first column, which is put back in service operation position at the end of its regeneration cycle, through the last column.

It should be observed that, in the regeneration operation, the exit Se of treated water is shut off, which is an advantage as far as the safety of use is concerned. Another advantage of the above described device, which is essential as far as reliability is concerned, resides in the fact that this device does not require any source of power other than hydraulic, so that it is not subject to failures of power such as electricity, compressed air and so on.

Of course, the invention is not restricted to the details of the above description but also includes all variations thereof.

I claim:

1. A device adapted to feed, drain and regenerate a treatment column used to treat fluids such as water, said device comprising: a compact centralized distribution valve joined to the top of said column, control means for controlling said distribution valve, and a hydro-injector adapted to be fed with said fluid which serves to aspirate a regeneration agent into said hydro-injector and further adapted to eject said fluid from said hydro-injector, said distribution valve comprising:
(a) a distribution chamber comprising a distribution inlet port for the intake of said fluid to be treated and a distribution outlet adapted to feed said fluid to said hydro-injector;
(b) a direction reversal chamber comprising a chamber inlet in fluid communication with said hydro-injector and adapted to receive said regeneration agent ejected by said hydro-injector, and first and second chamber passages, each of said first and second chamber passages being in fluid communication with said regeneration column and adapted to communicate the flow of said fluid and said regeneration agent between said distribution valve and said regeneration column; and
(c) an exit chamber comprising first and second exit outlets;
said distribution chamber being adapted to be connected in fluid communication with said direction reversal chamber and further comprising a piston adapted to move between first and second positions PE1 and PE2 respectively, said piston being arranged such that when said piston is in said first position PE1 and fluid is free to flow into said distribution chamber and towards said direction reversal chamber, and such that when said piston is in said second position PE2 said fluid is diverted to said hydro-injector; said direction reversal chamber being in fluid communication with said exit chamber, said direction reversal chamber comprising a reversal piston adapted to be moved between first and second reversal positions PI1 and PI2 respectively such that when said reversal piston is in said first reversal position PI1, said fluid is free to flow from either said distribution chamber or from said chamber inlet into said first chamber passage, then into said regeneration column, then through said second chamber passage, and then into said exit chamber, and when said reversal piston is in said second reversal position PI2, either said fluid is free to flow from said water distribution chamber or said regeneration agent is free to flow from said chamber inlet through said second chamber passage then into the regeneration column, then through said first chamber passage and then into said exit chamber; said exit chamber comprising an exit piston adapted to be moved between first and second positions, PS1 and PS2 respectively, such that when said exit piston is in said first position PS1 said fluid is free to flow from said direction reversal chamber to said first exit outlet and when said exit piston is in said second position PS2 fluid is free to flow from said direction reversal chamber to said second exit outlet.

2. The device as defined by claim 1 wherein said control means are adapted to position each of said pistons in said direction reversal chamber, said water distribution chamber and said exit chamber in each of the following positions:
(a) PE1, PI1, PS1 whereby said device is adapted to treat said fluid;
(b) PE1, PI2, PS2 whereby said device is adapted to flush said column;
(c) PE2, PS2 and PI1 or PI2 whereby said device is adapted to regenerate said column; and
(d) PE1, PI1, PS2 whereby said device is adapted to rinse said column.

3. The device as defined by claim 1 wherein said distribution chamber is mounted on top of said column and each of said exit and direction reversal chambers is positioned radially to said distribution chamber and horizontally thereto.

4. The device as defined by claim 3 wherein said hydro-injector is mounted onto said distribution chamber and extends radially therefrom, said hydro-injector comprising a hydro-injector outlet in fluid communication with said chamber inlet, and a hydro-injector inlet in fluid communication with said distribution outlet whereby fluid leaving said distribution outlet may drive said hydro-injector for the intake of said regeneration fluid.

5. The device as defined by claim 1 wherein said hydro-injector comprises a venturi adapted to aspirate said regeneration agent into said chamber inlet.

6. The device as defined by claim 1 wherein said column comprises an ion exchange resin.

7. The device as defined by claim 1 wherein each of said direction reversal, water distribution and exit chambers comprises an inlet connected to said hydraulic dispenser and wherein said hydraulic dispenser is adapted to hydraulically control each of said pistons in each of said direction reversal, water distribution and exit chambers through each of said inlets to each of said chambers.

8. The device as defined by claim 7 further comprising a central cam-shaft and three dispenser pistons radially positioned around the periphery of said central cam-shaft, each of said dispenser pistons being adapted to be biased against said central cam by virtue of hydraulic pressure exerted by a hydraulic fluid, whereby rotation of said cam-shaft selectively displaces said pistons thus permitting said hydraulic fluid to enter each of said distribution, direction reversal and exit chambers thereby exerting a hydraulic pressure on a first end of each of said pistons of each of said chambers.

9. The device as defined by claim 8 whereby a second side of said piston of said distribution chamber is in fluid communication with said distribution inlet port whereby said fluid being treated exerts a pressure on said second side of said piston of said distribution chamber in the direction of said position PE1; a second side of said piston of said direction reversal chamber is in fluid communication with said chamber inlet whereby fluid flowing through said chamber inlet and said distribution inlet port exerts a pressure on said second side of said piston of said direction reversal chamber in the direction of said first reversal position PI1; and a second side of said piston of said exit chamber is in fluid communication with fluid flowing out of said first exit outlet whereby said fluid exerts a pressure on said second side of said piston of said exit chamber in the direction of said position PS1.

10. The device as defined by claim 8 wherein said central cam-shaft is adapted to cause said dispenser pistons to assume positions resulting in the following four successive chamber piston configurations as said central cam-shaft is rotated:
(a) PE1, PI1, PS1 whereby said device is adapted to treat said fluid;
(b) PE1, PI2, PS2 whereby said device is adapted to flush said column;
(c) PE2, PI1, PS2 to whereby said device is adapted to co-currently regenerate said column; and
(d) PE1, PI1, PS2 whereby said device is adapted to rinse said column.

11. The device as defined by claim 8 wherein said central cam-shaft is adapted to cause said dispenser pistons to assume positions resulting in the following four successive chamber piston configurations as said central cam-shaft is rotated:
  (a) PE1, PI1, PS1 whereby said device is adapted to treat said fluids;
  (b) PE1, PI2, PS2 whereby said device is adapted to flush said column;
  (c) PE2, PI2, PS2 whereby said device is adapted to countercurrently regenerate said column; and
  (d) PE1, PI1, PS2 whereby said device is adapted to rinse said column.

12. The device as defined by claim 10 or 11 further comprising a manually rotatable knob mounted on said central cam shaft adapted to rotate said shaft to cause each of said chamber pistons to successively assume each of said configurations as a result of the positions adopted by each of said dispenser pistons as said knob is rotated.

13. The device as defined by claim 12 wherein said hydraulic dispenser is mounted on a console mounted on said column.

* * * * *